March 18, 1958     J. D. LESLIE ET AL     2,827,321
DOOR LATCH FOR A PILLARLESS AUTOMOBILE Filed Jan. 19, 1955                                          8 Sheets-Sheet 1

INVENTORS
James D. Leslie
Clyde H. Schamel
Harold E. VanVoorhees
BY
Paul Fitzpatrick
ATTORNEY March 18, 1958   J. D. LESLIE ET AL   2,827,321
DOOR LATCH FOR A PILLARLESS AUTOMOBILE
Filed Jan. 19, 1955   8 Sheets-Sheet 2

INVENTORS
James D. Leslie,
Clyde H. Schamel,
Harold E. VanVoorhees
BY
Paul Fitzpatrick
ATTORNEY March 18, 1958  J. D. LESLIE ET AL  2,827,321
DOOR LATCH FOR A PILLARLESS AUTOMOBILE
Filed Jan. 19, 1955  8 Sheets-Sheet 3

INVENTORS
James D. Leslie &
Clyde H. Schomel
Harold E. VanVoorhees
BY
Paul Fitzpatrick
ATTORNEY

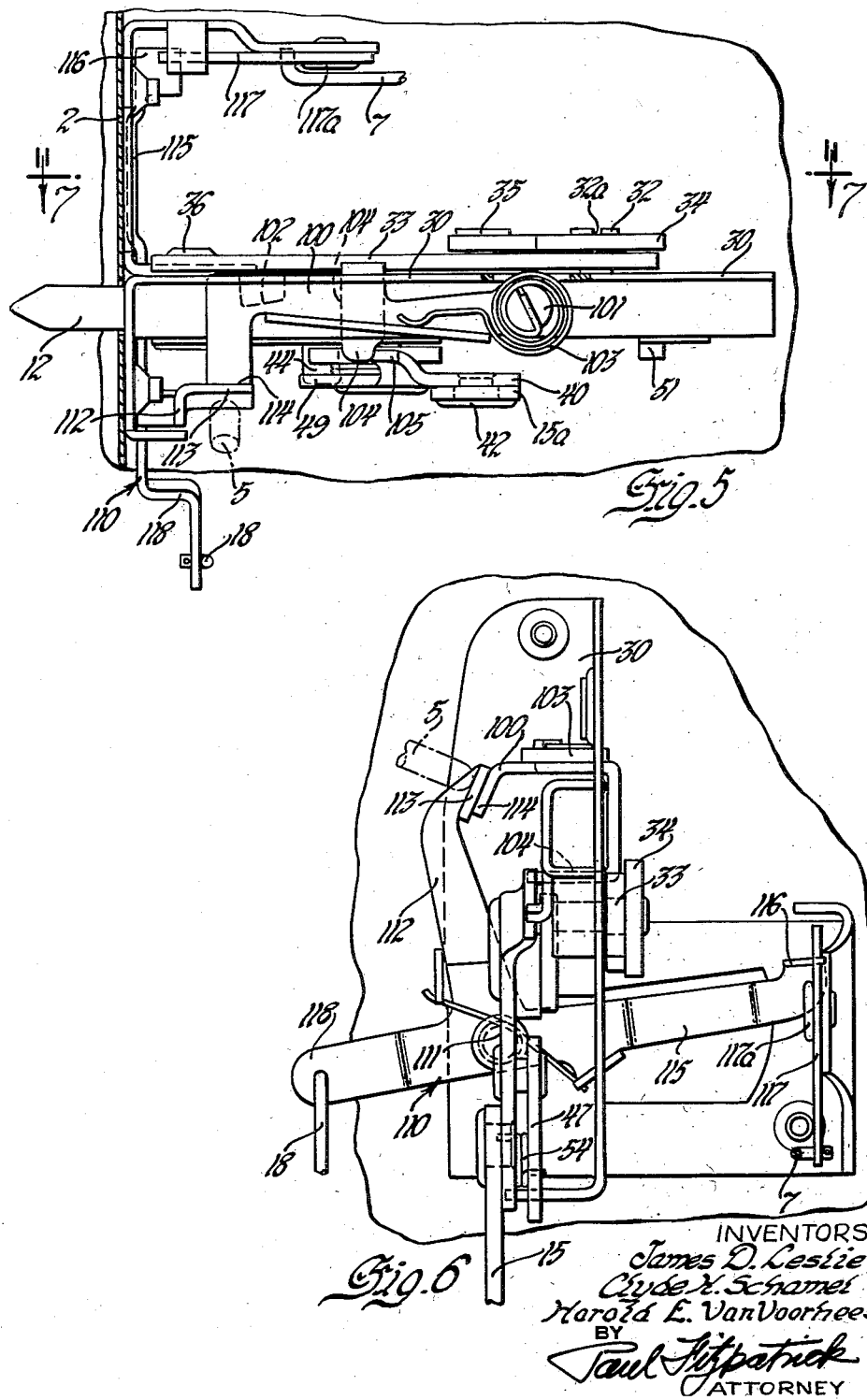

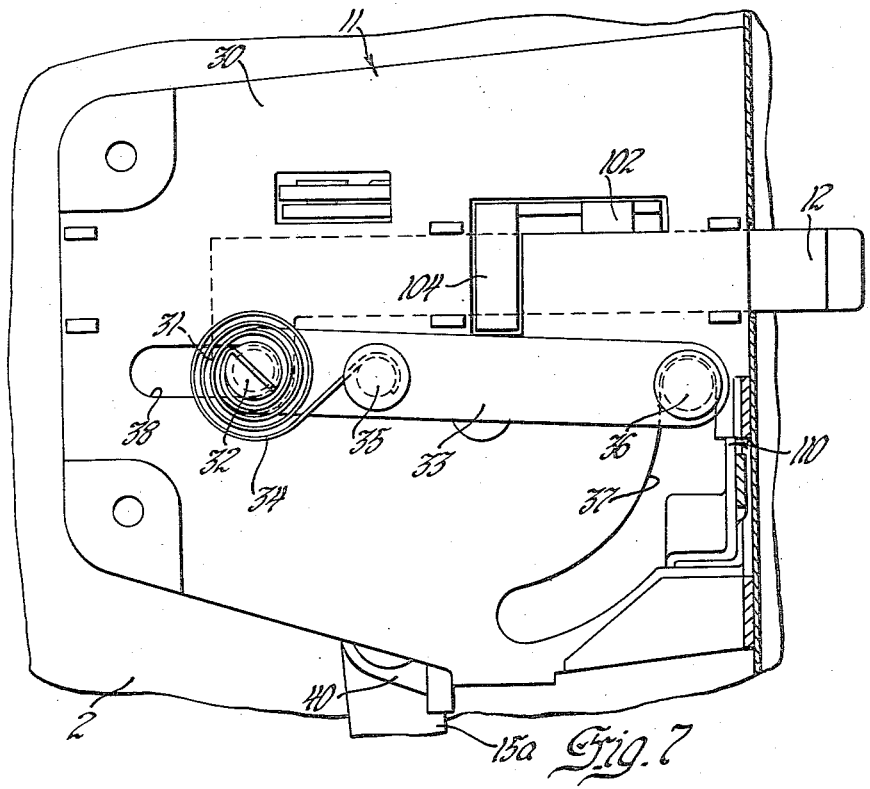
Fig. 7
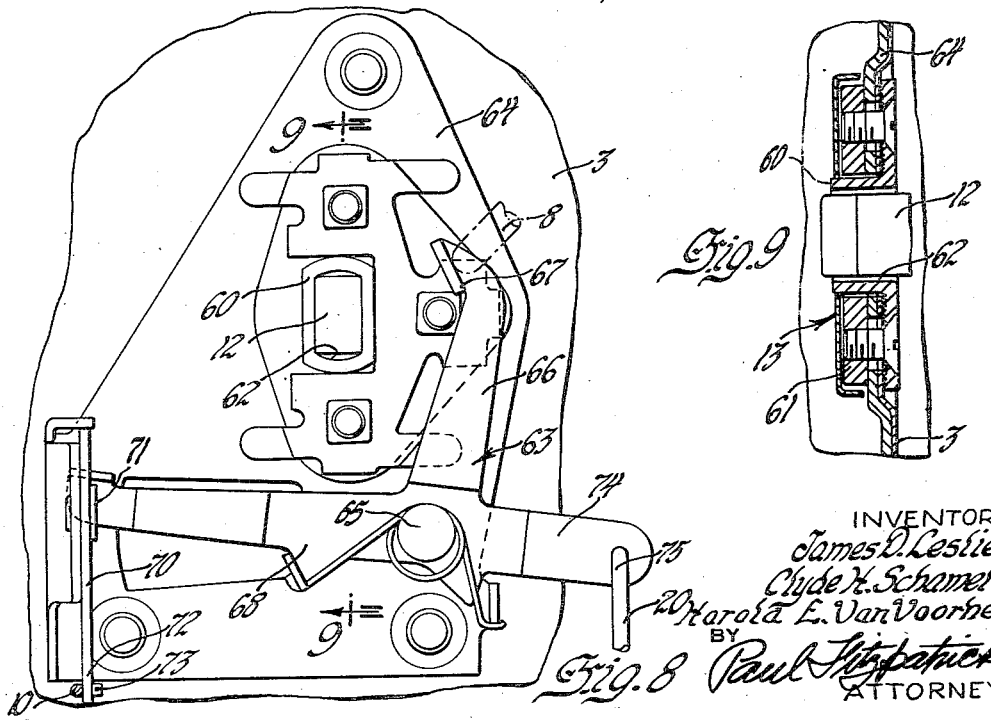
Fig. 8
Fig. 9
INVENTORS
James D. Leslie &
Clyde H. Schames
Harold E. VanVoorhees
BY Paul Fitzpatrick
ATTORNEY

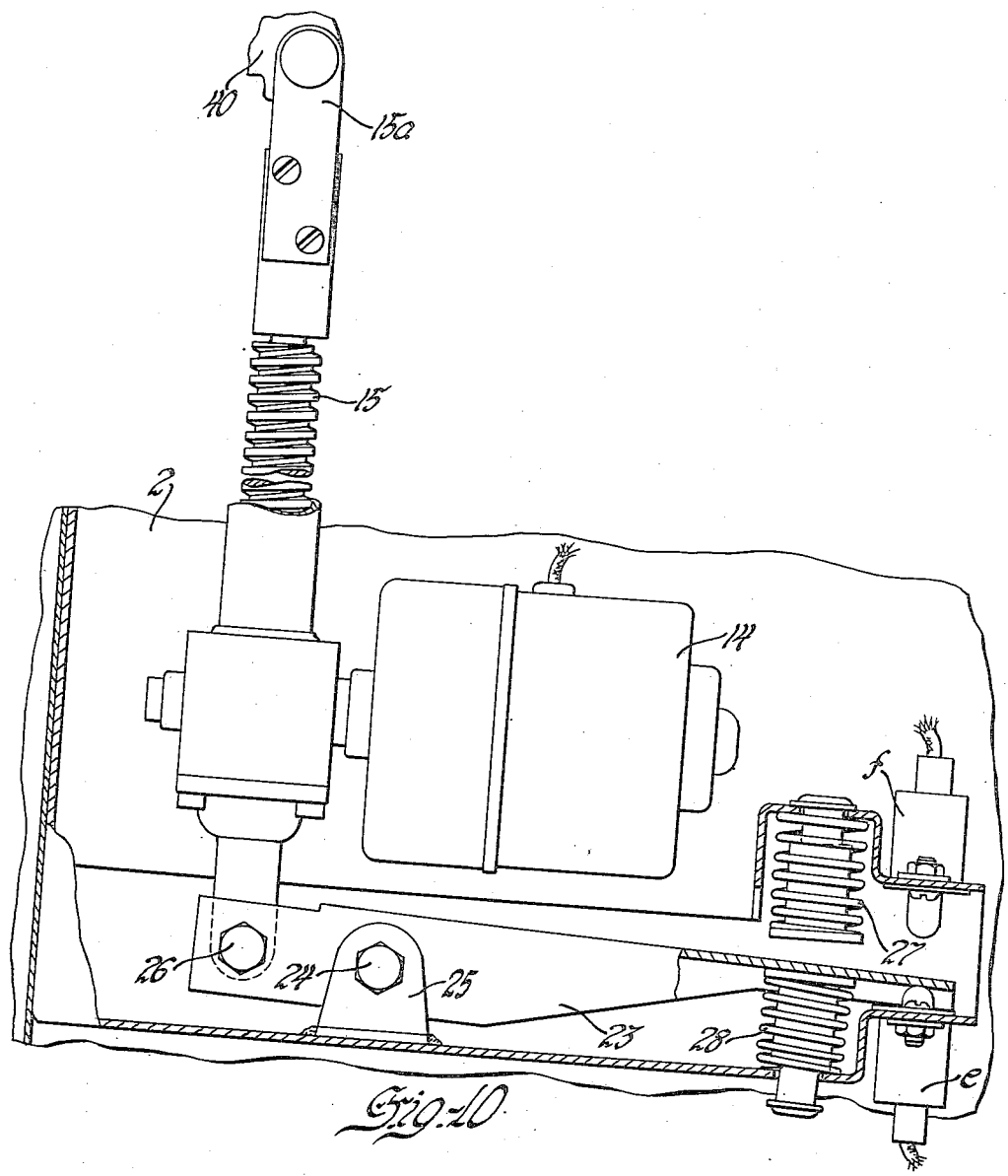

March 18, 1958  J. D. LESLIE ET AL  2,827,321
DOOR LATCH FOR A PILLARLESS AUTOMOBILE
Filed Jan. 19, 1955  8 Sheets-Sheet 7
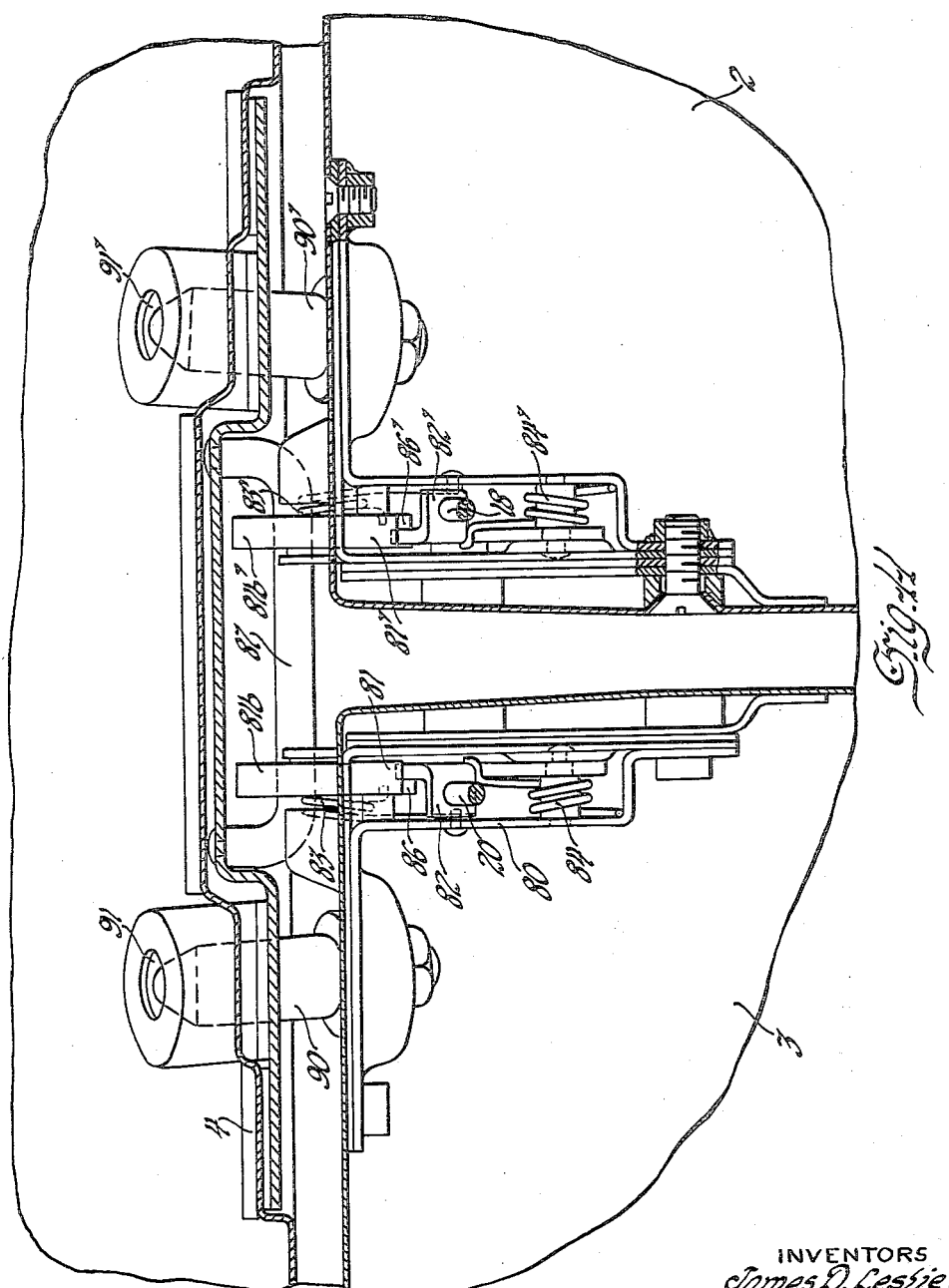
INVENTORS
James D. Leslie &
Clyde H. Schamel
Harold L. VanVoorhees
BY
Paul Fitzpatrick
ATTORNEY March 18, 1958    J. D. LESLIE ET AL    2,827,321
DOOR LATCH FOR A PILLARLESS AUTOMOBILE
Filed Jan. 19, 1955    8 Sheets-Sheet 8
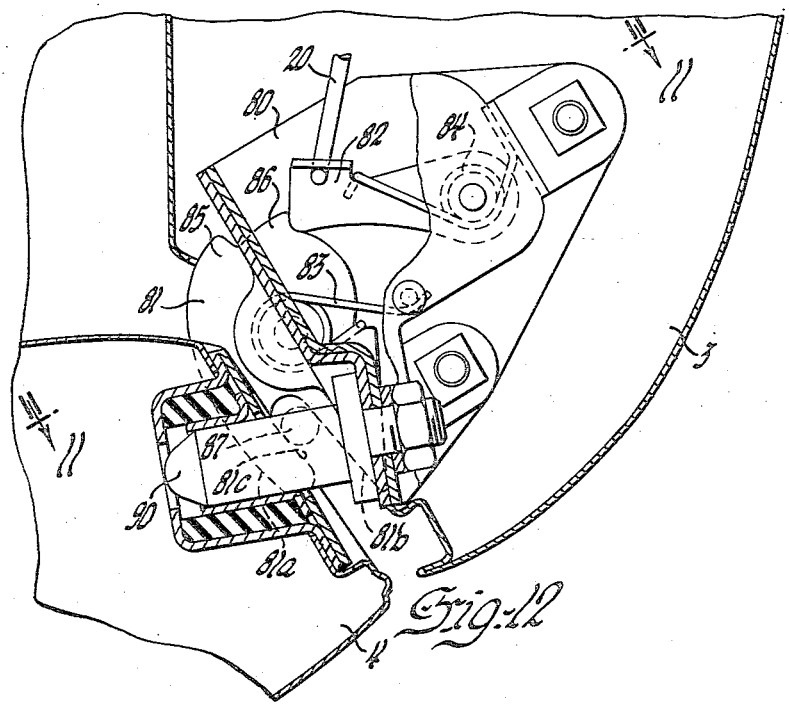
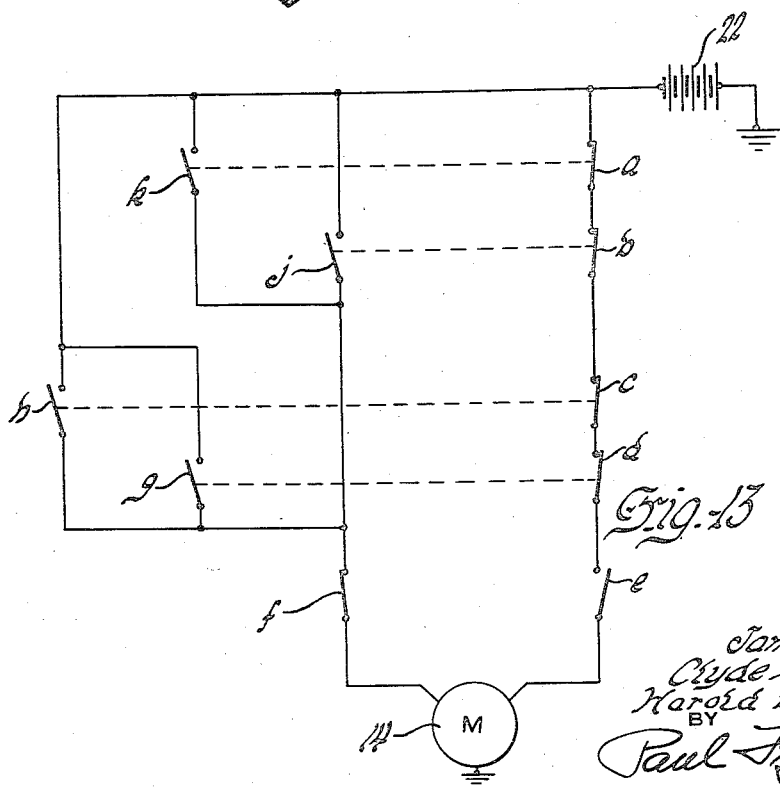
INVENTORS
James D. Leslie &
Clyde H. Schamel
Harold E. VanVoorhees
BY
Paul Fitzpatrick
ATTORNEY

United States Patent Office 2,827,321
Patented Mar. 18, 1958

2,827,321

DOOR LATCH FOR A PILLARLESS AUTOMOBILE

James D. Leslie, Birmingham, Clyde H. Schamel, Royal Oak, and Harold E. Van Voorhees, Grosse Pointe Woods, Mich., assignors to General Motors Corporation, Detroit, Mich., a corporation of Delaware Application January 19, 1955, Serial No. 482,772

10 Claims. (Cl. 292—5)

This invention relates to automobile door latching means, and more particularly to a latching system and to a novel latch for a pillarless 4-door automobile.

One feature of the invention is that it provides improved door latching means; another feature of the invention is that it provides an improved motor operated latch; still another feature of the invention is that there are automatically operable means associated with the latch for disconnecting it from the motor operator to provide for manual operation of the latch without operation of the motor; still a further feature of the invention is that it provides an improved electro-mechanical latching system for a pillarless automobile; a further feature of the invention is that it provides novel means for latching the front and rear doors to each other and to the automobile sill or rocker panel; another feature of the invention is that it provides a latching system for a pillarless automobile wherein the front and rear doors are latched to each other, which system can be electrically operated by a motor ram device through control means on the front and the rear door, and in which the front and rear doors are latched to the sill by subsidiary latches which are released mechanically by control means on each respective door; yet a further feature of the invention is that mechanical means are provided for releasing the main latch in the event of power failure; still another feature of the invention is that it provides an electrical interlock to prevent the motor ram from moving the bolt to latched position unless both front and rear doors are closed; and still another feature of the invention is that it provides a novel mounting means and limit switch actuator for the motor.

Other features and advantages of the invention will be apparent from the following description and from the drawings, in which:

Fig. 5 is a top plan view of the latch, looking along the line 5—5 of Fig. 2;

Fig. 6 is an end elevation of the latch, looking forwardly;

Fig. 7 is a side elevation of the latch looking from inside the door;

Fig. 8 is a view of the rear door latch operating means, looking along the line 8—8 of Fig. 2;

Fig. 9 is a vertical section through the striker, taken along the line 9—9 of Fig. 8;

Fig. 10 is an enlarged view, partly in section, showing the motor operating means for the latch;

Fig. 11 is a section through the lower portion of the front and rear doors and the sill, showing the subsidiary latch means and taken along the line 11—11 of Fig. 12;

Fig. 12 is an enlarged vertical transverse section through the lower portion of the rear door and sill, taken along the line 12—12 of Fig. 1; and Fig. 13 is a schematic diagram of the electrical circuit for operating the latch means.

Figure 1:
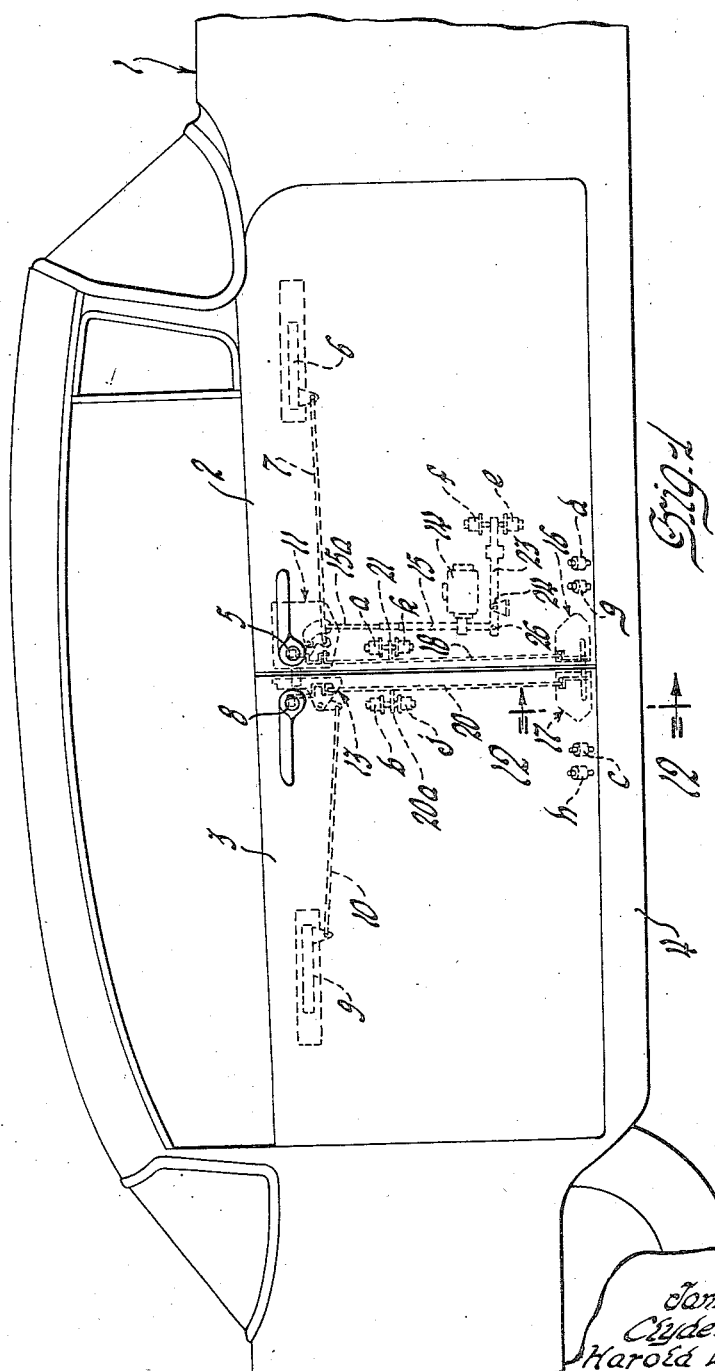
Fig. 1 is a fragmentary side elevation of an automobile having the improved latching means structure which underlies the outer panels of the automobile body being shown in broken lines.

This door latch is particularly designed for a pillarless 4-door automobile of the type designated generally as 1 in Fig. 1. The automobile has a front door 2 hingedly mounted at its front side on the body and a rear door 3 hingedly mounted at its rear side on the body. These are so-called convertible type doors which do not have a window frame, so consequently there is no means for latching the doors to the side roof rail of the automobile. The hinge mountings for the doors may be conventional and are not illustrated. The doors 2 and 3 are latched to each other by a main latch 11, and the front door is latched at its lower rear corner to the automobile sill or rocker panel 4 by a subsidiary sill latch 16, while the rear door is latched at its lower front corner to the sill 4 by a subsidiary sill latch 17. The front door may be opened from the outside by means of a push button and rod device 5, or the door may be opened from the inside by means of a remotely located handle 6 connected to the main latch through an actuating rod 7. The rear door may be opened from the outside by means of an outside push button and rod device 8, or it may be opened from the inside by means of a remotely located inside handle 9 connected to the rear door latch operating means through an actuating rod 10.

General description

Figure 2:
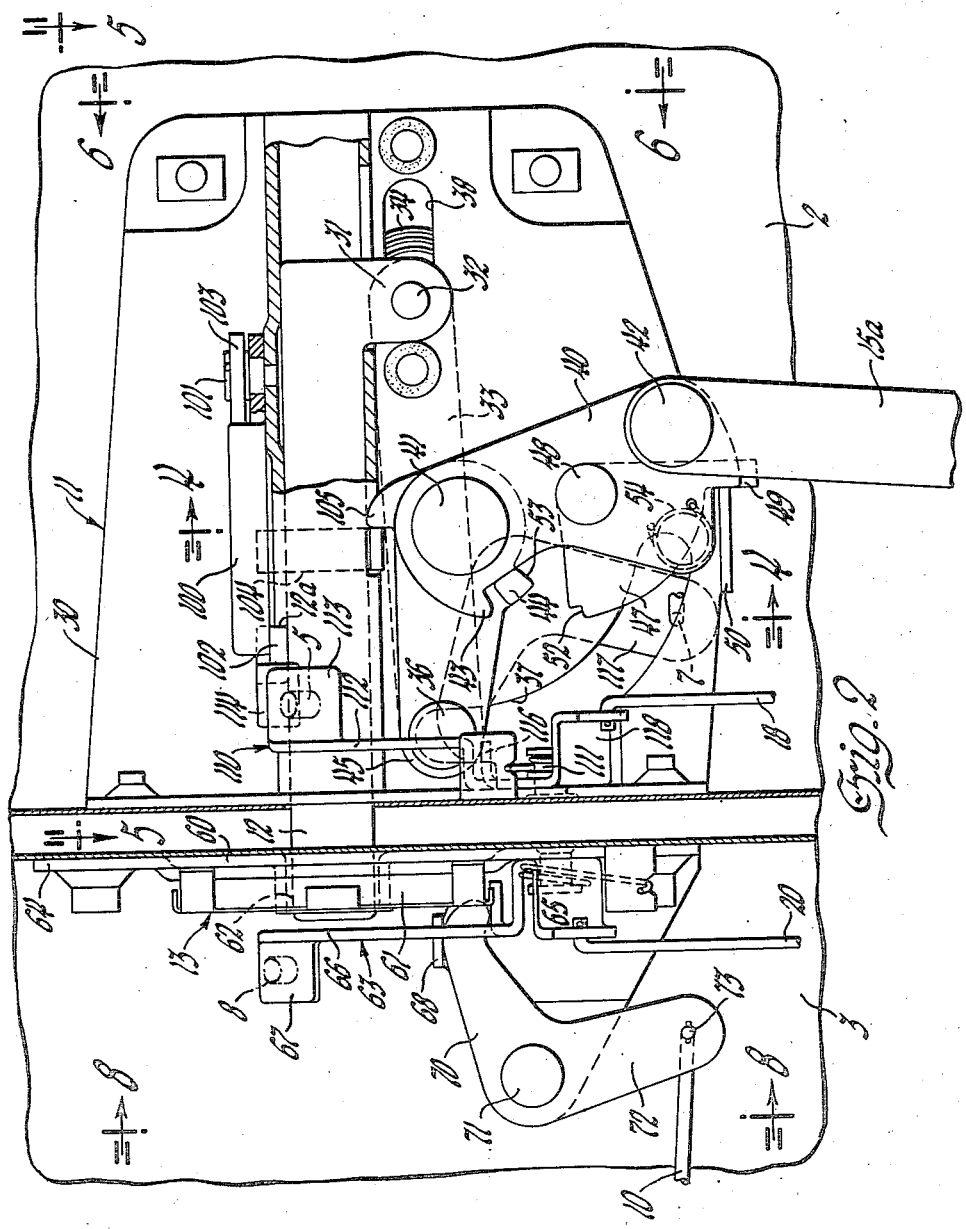
Fig. 2 is an enlarged vertical longitudinal section taken inside the outer front and rear door panels, the latch being shown in side elevation and partly in section.
Figure 3:
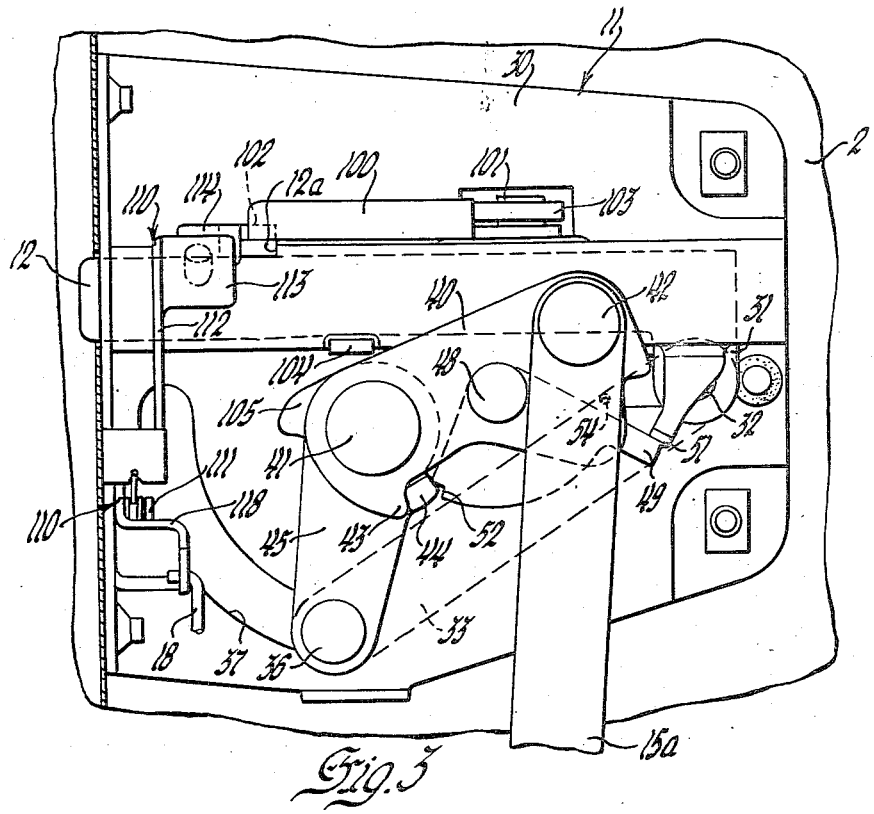
Fig. 3 is an elevation of the latch with the parts shown in unlatched position.
Figure 4:
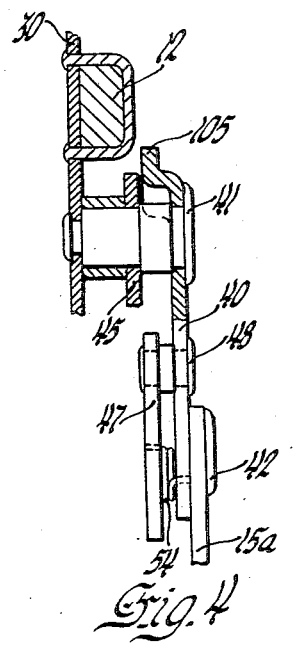
Fig. 4 is a vertical transverse detail section taken along the line 4—4 of Fig. 2.

The front door 2 carries the main door latch 11, which latch has a motor operated slide bolt 12 engaging in a striker 13 on the rear door 3 to latch the front and rear doors together. A reversible motor 14 and screw jack 15 (see Figs. 1 and 10) are utilized for moving the bolt between an extended or latched position as shown in Figs. 2, 5 and 7 and a retracted or unlatched position as shown in Fig. 3. As will appear from the description of the wiring diagram of Fig. 13, the motor 14 has a retracting circuit and a latching circuit.

There is also a mechanically operated subsidiary sill latch 16 at the bottom of the front door 2 and an identical sill latch 17 at the bottom of the rear door 3. These sill latches, which are shown in Figs. 1, 11 and 12, anchor the bottom of the doors to the sill.

When the front door inner handle 6 or outer push button 5 is operated to open the door, the sill latch 16 is released mechanically through a rod 18, and at the same time, this rod operates a motor switch to close the retracting circuit to the motor 14 to retract the latch bolt 12. There is also a mechanical release means for the latch bolt 12 so that the door can be opened in the event of power failure.

Operation of the rear door handle 9 pulls on a rod 20 to trigger the rear door sill latch 17. At the same time, rod 20 operates a motor switch in the retracting circuit to actuate the motor 14 in the front door and unlatch the rear door from the front door. There is no mechanical means for opening the rear door.

Upon closing the doors, door sill switches are actuated to operate the motor 14 and move the bolt 12 to its latched position. The electrical circuit includes interlocks to prevent the main latch bolt from being moved to latched position when either door is open.

Operating circuit

In order to control the reversible motor 14 there are six single pole, single throw switches in the front door and four single pole, single throw switches in the rear door. The ten switches are arranged in pairs, each pair having a common actuator. In the front door below the main latch 11 there is a pair of motor switches *a* and *k*, the switch *a* being normally closed and the switch *k* being normally open. Normal conditions are taken to be when both front and rear doors are closed and the main latch is latched. The front door also carries a pair of motor limit switches *e* (normally open) and *f* (normally closed) and a pair of sill switches *d* (normally closed) and *g* (normally open). In the rear door there are a pair of motor switches *b* (normally closed) and *j* (normally open) and a pair of sill switches *c* (normally closed) and *h* (normally open). The motor switches operate the main latch 11 when one of the doors is opened by the front or rear inner or outer operating handle or push button; the limit switches deenergize the motor when the cycle is completed; and the sill switches operate the latch when the door is slammed shut and also provide an interlock to prevent latching operation of the bolt 12 unless both doors 2 and 3 are closed so that the bolt and striker are in their proper interengaging positions.

Assuming both doors to be closed, which is the condition shown in the wiring diagram of Fig. 13, the front door 2 can be opened by either its inside handle 6 or by its outside push button 5. Manipulation of either the handle or the push button pulls up on rod 18 to trigger the bolt in sill lock 16 and release this bolt from latching engagement with its striker. At the same time, an actuator 21 on the rod 18 moves upwardly to open switch *a* in the latching circuit and close switch *k* in the retracting circuit. In Fig. 13 the latching circuit comprises that portion of the diagram located at the right of the motor 14, and the retracting circuit comprises that portion of the diagram located at the left of the motor 14. Both circuits are connected to the automobile battery 22.

It should be noted that when the manual operating handle or push button is released, the rod 18 returns to its original position and switches *a* and *k* are returned to their normal condition which is illustrated in the wiring diagram. When the actuator 21 closes switch *k* a retracting circuit is completed through motor switch *k* and limit switch *f* to energize motor 14 so that its screw jack 15 drives upwardly to extended position (Fig. 3) to retract the bolt 12. When the door is manually pulled open, sill switch *d* in the latching circuit is opened and sill switch *g* in the retracting circuit is closed, this latter switch providing a holding circuit around switch *k* so that the motor 14 remains energized even though the rod 18 and actuator 21 return to their normal positions as shown in the drawing. When the bolt 12 is fully retracted actuator 23, which is connected to the motor, moves in a manner later to be described to close limit switch *e* (see Fig. 10) in the latching circuit and open limit switch *f* in the retracting circuit, this latter switch breaking the circuit to motor 14.

When the front door 2 is slammed shut (assuming the rear door 3 to be shut), sill switches *d* and *g* are returned to the condition shown in the wiring diagram, switch *d* being closed and switch *g* being open. Since the motor limit switch *e* is now held closed by the actuator 23 on the motor, and since motor switch *a* is now closed by the earlier movement of the rod 18 and actuator 21 to the position shown in the drawing, a latching circuit is closed through switches *a*, *b*, *c*, *d* and *e* to energize motor 14 and move the bolt 12 back to its latching position shown in Figs. 2, 5 and 7. When the bolt reaches latching position, the actuator 23 moves in a manner later to be described to open switch *e* and close switch *f*.

In order to open the rear door, either the inside or outside rear door operating mechanism may be manipulated to pull up on rod 20, which rod is connected to and mechanically triggers the sill latch 17. At the same time, an actuator 20*a* on the rod 20 opens switch *b* in the latching circuit of motor 14 and closes switch *j* in the retracting circuit, thereby energizing motor 14 to retract the bolt 12. When the bolt reaches its retracted position, the actuator 23 opens limit switch *f* and closes limit switch *e*. When the rear door is pulled away from the rocker panel, rear sill switch *c* in the latching circuit is opened and rear sill switch *h* in the retracting circuit is closed, this latter switch providing a holding circuit around the motor switch *j* so that the motor 14 continues to be energized even though the rod 20 is returned to its normal position when the manual operating mechanism is released.

When the rear door is slammed shut (assuming the front door to be closed), sill switch *h* is opened and sill switch *c* is closed, this latter switch completing a latching circuit through motor 14 to move the bolt 12 to latched position.

Since the bolt 12 latches the front door 2 to the rear door 3, the bolt must remain retracted so long as either door is open. Assuming both doors to be open and the front door to be slammed shut, the sill switch *c* in the rear door will still be open so that motor 14 cannot be energized despite the fact that all of the other switches in the latching circuit are closed. Now when the rear door is closed, sill switch *c* will close and motor 14 will be energized.

Referring to Fig. 10, the actuator 23 for the limit switches *e* and *f* is a steel channel member pivotally mounted intermediate its ends at 24 on a bracket 25 on the door panel. This actuator forms a lever of the first class, being fulcrumed intermediate its ends and having one end connected to and supporting the motor 14 at 26 and the other end extending between balance springs 27 and 28 and between the limit switches *e* and *f*. When the motor is in the normal latched position of Fig. 10 the actuator 23 is spaced from the actuating plunger of switch *f* and depresses the plunger of switch *e* so that limit switch *f* is permitted to close under the force of an internal spring and limit switch *e* is held open by the actuator 23. When the motor 14 drives the screw jack 15 to extended position in the latch retracting operation shown in Fig. 3, the screw jack is stopped from further extending movement. The motor and screw jack then exert sufficient downward force through the connection 26 to pivot the lever 23 in a counterclockwise direction and overcome spring 27 (which is stronger than spring 28), causing the actuator 23 to permit switch *e* to close and to open switch *f*. When the motor is operated to retract the screw jack away from its stop, the actuator assumes its normal position of Fig. 10 wherein switch *e* is open and switch *f* is closed.

Main latch

The main latch 11, which is illustrated in Figs. 3–7, has a frame 30 upon which the bolt 12 is slidably mounted. At the end remote from its latching end the bolt has an integral downwardly extending ear 31 which is connected by a stud 32 to a link 33 on the opposite side of the frame 30. The stud 32 extends through an elongated rectilinear slot 38 in the frame. The stud 32 also forms mounting means for a helical bolt retracting spring 34, the inner end of which is anchored to the bolt in a slot 32*a* in the head of the stud 32 and the outer end of which is anchored to the link 33 by a rivet 35. At its forward end, the link 33 carries a rivet 36 which extends through an arcuate slot 37 in the frame 30. This slot forms a track for guiding swinging movement of the forward end of the link 33, the rear end of said link being guided for rectilinear movement in the straight horizontal slot 38 in the frame. Since the arcuate slot 37 extends downwardly and rearwardly, swinging movement of the forward end of the link 33 along the slot 37 from the position shown in Figs. 2 and 7 to the position of Fig. 3 causes rearward rectilinear movement of the rear end of the link 33 in the slot 38, and consequent sliding movement of the bolt 12 from latched to unlatched position.

The link 33 is shifted between the latched position shown in Figs. 2 and 7 and the unlatched position of Fig. 3 by a drive mechanism including a drive link 40 which is pivoted on the frame at 41. The lower end of link 40 is pivotally connected to the upper end of an extension 15a of the screw jack device 15 by means of a rivet 42. The link 40 has a projection 43 forming a shoulder for engagement with a lug 44 which projects transversely from an intermediate lever 45 that is pivoted coaxially with link 40 on the stud 41. The intermediate link 45 lies between link 40 and frame 30 and is connected to the link 33 through the rivet 36. Consequently, when link 40 is driven in a counterclockwise direction from the position of Fig. 2 to the position of Fig. 3 upon extending movement of the screw jack 15, projection 43 will pick up lug 44 to drive links 45 and 33, causing the bolt 12 to move to its unlatched position.

If no mechanical operating means were provided for the bolt, a permanent connection between links 40 and 45 would suffice to operate the bolt between latched and unlatched positions. It is desirable, however, to provide mechanical means for operating the bolt in the event of power failure. To permit mechanical operation of the bolt without simultaneous operation of the screw jack there is a triggering pawl 47 which permits the bolt 12 and the links 33 and 45 to be driven to bolt unlatched position independently of the driving link 40 and the screw jack 15. Since the latch mechanism is inside the door panels and there is no means of access to this mechanism without removing one of the door panels, the triggering pawl 47 cannot be manually operated whenever the necessity arises, but must be automatically operated so that the bolt can be moved to unlatched position either manually or mechanically through the screw jack 15.

The pawl 47 is pivotally mounted on the driving link 40 by a rivet 48. The pawl has a stop tab 49 which, in Fig. 2, is shown in engagement with a stop 50 bent from the frame 30. Another stop member 51 on the frame is adapted to be engaged by the tab 49 when the driving link 40 is swung in a counterclockwise direction towards unlatched position. If the screw jack is extended by operation of the motor 14, the driving link 40 will swing in a counterclockwise direction, carrying with it the pawl 47. As the unlatching limit position is approached (but not reached) the tab 49 on the pawl 47 will abut the stop 51, swinging the pawl 47 in a clockwise direction with respect to the link 40 and bringing a notched dogging shoulder 52 of the pawl into abutting relation with the surface 53 of the lug 44. Now, upon reverse or clockwise movement of the driving link 40, the pawl 47 will connect link 40 to the intermediate link 45 through the lug 44. As the parts approach the latched position shown in Fig. 2, the tab 49 abuts stop 50 on the frame, causing counterclockwise movement of the pawl 47 with respect to the link 40 and moving the notch 52 out of engagement with the lug 44 so that the bolt can be manually retracted without moving the screw jack. An overcenter spring 54 releasably holds the pawl 47 in either of its two positions.

In order to hold the bolt 12 in its latching position, there is a detent 100 atop the bolt pivotally mounted on the frame at 101 and having a latch blocking portion 102 which engages in a notch 12a in the top surface of the bolt. A spring 103 urges the detent 100 in a counterclockise direction as the parts appear in the plan view of Fig. 5 so that the latch blocking portion 102 shown in Fig. 2 enters the notch 12a in the top surface of the latch bolt to hold the bolt against retracting movement.

In order to move the bolt to unlatched position, either manually or by means of the electro-mechanical drive earlier described, it is necessary to pivot the detent out of blocking relation to the bolt. In order to accomplish this for the electro-mechanical drive, the detent has an arm 104 extending underneath the bolt into the path of movement of a lug 105 projecting from the drive link 40. Upon initial movement of the link 40 in a counterclockwise direction, lug 105 will pick up detent arm 104 to cam the detent out of blocking relation to the bolt before lug 43 on the driving link picks up lug 44 on the intermediate link 45, the lugs 43 and 44 being spaced to permit this lost motion, as shown in Fig. 2.

Referring particularly to Fig. 6, in order to open the door mechanically from the inside or from the outside and in order to provide a mechanical actuator for motor switches $a$ and $k$, there is an operating lever 110 pivotally mounted on a rivet 111 in the jamb face of the latch frame. The operating lever has an upwardly extending arm 112 with a turned tab 113 adapted to engage a complementary tab 114 on the detent 100. The outside push button actuator 5 also engages the tab 113, so that when the door is opened from the outside, the operating lever 110 is pivoted in a clockwise direction (see Fig. 6) and the detent 100 is moved to its out of the way position to free the bolt 12 for retracting movement. Spring 34 then retracts the bolt.

The operating lever 110 has a horizontally extending arm 115 which terminates adjacent the inner door panel in a turned tab 116 adapted to be engaged by a remote operating lever 117 when the inner remote door handle 6 is operated. Lever 117 is pivoted on a stud 117a on the frame. Operation of the remote handle 6 pivots lever 110 in a clockwise direction in the same manner as does operation of the outside push button. A third arm 118 on the lever 110 is connected to the operating rod 18 so that this rod is raised and the sill latch 16 is released mechanically whenever the door is opened, and the motor switches $a$ and $k$ are operated by the actuator 21 on the rod 18.

Rear door latch actuating means

As shown in Figs. 8 and 9, the rear door striker merely comprises plates 60 and 61 on a frame 64, the members 60, 61 and 64 having a generally rectangular opening 62 to receive the end of the latch bolt 12. No parts of the striker are movable. However, this assembly does include a release mechanism for the main and rear sill latches. There is a bell crank 63 pivoted on the striker frame 64 at 65 and having an upwardly extending arm 66 with a tab 67 for operation by the rear door outside push button rod 8. Another arm 68 of this bell crank extends towards the inner door panel and is pivotally connected to a remote lever 70 which is pivotally mounted on the door at 71. The lever 70 has a downwardly extending arm 72 connected at 73 to the remote actuating rod 10 extending from the inside handle 9. The lever 63 has another arm 74 connected at 75 to the operating rod 20 for the sill latch 17 and motor switches $b$ and $j$ as shown in Fig. 1. The operation of the rear door inner or outer opening means mechanically releases the sill latch 17 and electrically releases the main latch 11. There is no mechanical means for operating the main latch 11 from the rear door.

Sill latch

The sill latches 16 and 17 shown in Figs. 11 and 12 are identical and only the rear door latch 17 will be described in detail. The same reference characters with a prime (') designate corresponding parts in the front door latch 16. The latch frame 80, which is mounted on the door, carries a pivoted bolt 81 and a pivoted detent 82. The bolt is bifurcated, having fingers 81a and 81b spaced by a latching recess 81c. A spring 83 urges the bolt towards unlatched position and a spring 84 urges the detent towards engagement with latching teeth 85 and 86 on the bolt. The detent is connected to the rod 18 (or 20 in the rear door). When the rod 20 is moved upwardly, it releases the detent 82 and permits the bolt to swing to unlatched position.

The striker is carried on the sill 4 and is formed as a U as shown at 87 in Fig. 11. The bolts for both latches 16 and 17 engage this same U-shaped striker. There is also a dovetail dowel 90 carried by the door. This dovetail enters a recess 91 in the sill to hold the door in position when the door is closed.

While we have shown and described one embodiment of our invention, it is capable of many modifications. Changes, therefore, in the construction and arrangement may be made without departing from the spirit and scope of the invention as set forth in the appended claims.

We claim:

1. A door latching system for a pillarless automobile having a body with front and rear doors, the free edges of which lie closely adjacent each other when the doors are closed, comprising: means for latching the free swinging edges of the doors to each other including a bolt movable between latched and unlatched positions; and interlock means operable by either door to prevent movement of said bolt to latched position when either door is open, said bolt, when in latched position, lying in the path of closing movement of the free swinging edge of one door.

2. A door latching system for a pillarless automobile having a body with front and rear doors, the free edges of which lie closely adjacent each other when the doors are closed, comprising: means for latching the free swinging edges of the doors to each other including a bolt movable between latched and unlatched positions; common control means for unlatching the doors from each other and simultaneously unlatching a door from the body; and interlock means operable by either door to prevent movement of said bolt to latched position when either door is open, said bolt, when in latched position, lying in the path of closing movement of the free swinging edge of one door.

3. A door latching system for a pillarless automobile having a body with front and rear doors, the free edges of which lie closely adjacent each other when the doors are closed, including: a main latch on one door; a striker on the other door, said latch engaging in said striker to latch the doors together when the doors are closed; a subsidiary latch on each of said doors for latching each door to the body; first control means on the front door including a common actuator for the main latch and the front door subsidiary latch; and second control means on the rear door including a common actuator for the main latch and the rear door subsidiary latch.

4. A door latching system for a pillarless automobile having a body with front and rear doors, the free edges of which lie closely adjacent each other when the doors are closed, including: a main latch on the front door, said latch having a bolt movable between latched and unlatched positions; a striker on the rear door, said bolt engaging in said striker to latch the doors together when the doors are closed; a subsidiary latch on each of said doors for latching each door to the body; electrical means for operating said main latch; mechanical means for operating each subsidiary latch; first control means on the front door including a common actuator for said electrical means and for the mechanical operating means for the front subsidiary latch; and second control means on the rear door including a common actuator for said electrical means and for the mechanical operating means for the rear subsidiary latch.

5. A door latching system for a pillarless automobile having a body with front and rear doors, the free edges of which lie closely adjacent each other when the doors are closed, including: a main latch on the front door, said latch having a bolt movable between latched and unlatched positions; a striker on the rear door, said bolt engaging in said striker to latch the doors together when the doors are closed; a subsidiary latch on each of said doors for latching each door to the body; electrical means for operating said main latch; mechanical means for operating each subsidiary latch; first control means on the front door including a common actuator for said electrical means and for the mechanical operating means for the front subsidiary latch; second control means on the rear door including a common actuator for said electrical means and for the mechanical operating means for the rear subsidiary latch; and electrical interlock means preventing operation of said bolt to latched position when either door is open.

6. A door latching system for a pillarless automobile having a body with front and rear doors, the free edges of which lie closely adjacent each other when the doors are closed, including: a main latch on the front door, said latch having a bolt movable between latched and unlatched positions; a striker on the rear door, said bolt engaging in said striker to latch the doors together when the doors are closed; a subsidiary latch on each of said doors for latching each door to the body; electrical means for operating said main latch; mechanical means for operating said main latch; mechanical means for operating each subsidiary latch independently of the other; first control means on the front door including a common actuator for said electrical means, for the mechanical operating means for the main latch and for the mechanical operating means for the front subsidiary latch; and second control means on the rear door including a common actuator for said electrical means and for the mechanical operating means for the rear subsidiary latch.

7. A door latching system for a pillarless automobile having a body with front and rear doors, the free edges of which lie closely adjacent each other when the doors are closed, including: a main latch on the front door, said latch having a bolt movable between latched and unlatched positions; a striker on the rear door, said bolt engaging in said striker to latch the doors together when the doors are closed; a subsidiary latch on each of said doors for latching each door to the body; electrical means for operating said main latch; mechanical means for operating said main latch; mechanical means for operating each subsidiary latch independently of the other; first control means on the front door including a common actuator for said electrical means, for the mechanical operating means for the main latch and for the mechanical operating means for the front subsidiary latch; second control means on the rear door including a common actuator for said electrical means and for the mechanical operating means for the rear subsidiary latch; and electrical interlock means preventing operation of said bolt to latched position when either door is open.

8. A door latching system for a pillarless automobile having a body with front and rear doors, the free edges of which lie closely adjacent each other when the doors are closed, including: a main latch on one door; a striker on the other door, said latch engaging in said striker to latch the doors together when the doors are closed; electrical means for operating said latch; control means on each of said doors for actuating said electrical means; mechanical means for operating said latch; control means on the door on which said latch is mounted for actuating said mechanical means; a subsidiary latch on each of said doors for latching each door to the body; mechanical means on each door for operating the subsidiary latch on that door; and actuating means connected to said control means and to said mechanical means for controlling the main latch and the subsidiary latch on one door simultaneously.

9. A door latching system for a pillarless automobile having a body with front and rear doors, the free edges of which lie directly adjacent each other when the doors are closed, comprising: means for latching the doors to each other adjacent their free edges; means for latching each door to the body adjacent the free swinging edge of each door; single control means having an operator on the front door only for unlatching the doors from each other and unlatching the front door from the body; and single control means having an operator on the rear door only for unlatching the doors from each other and unlatching the rear door from the body.

10. A door latching system for a pillarless automobile having a body with front and rear doors, the free edges of which lie closely adjacent each other when the doors are closed, including: a main latch on one door; a striker on the other door, said latch engaging in said striker to latch the doors together when the doors are closed; a subsidiary latch on each of said doors for latching the door to the body; single control means on the front door for the main latch and the front door subsidiary latch; and single control means on the rear door for the main latch and the rear door subsidiary latch.

References Cited in the file of this patent

UNITED STATES PATENTS

| | | |
|---|---|---|
| 279,334 | Clark | June 12, 1883 |
| 1,247,052 | Wilson | Nov. 20, 1917 |
| 1,346,670 | Page | July 13, 1920 |
| 1,635,028 | Burr | July 5, 1927 |
| 1,776,265 | Martel | Sept. 23, 1930 |
| 1,869,274 | Phillips | July 26, 1932 |
| 2,363,364 | Rugg | Nov. 21, 1944 |